(12) United States Patent
Wang et al.

(10) Patent No.: US 10,525,843 B1
(45) Date of Patent: Jan. 7, 2020

(54) COMMON MODE CURRENT REDUCTION HYBRID DRIVE SYSTEM

(71) Applicant: FORD GLOBAL TECHNOLOGIES, LLC, Dearborn, MI (US)

(72) Inventors: Jiyao Wang, Canton, MI (US); Wei Xu, Canton, MI (US); Yinghan Xu, San Jose, CA (US); Silong Li, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/012,136

(22) Filed: Jun. 19, 2018

(51) Int. Cl.
| | | |
|---|---|---|
| *B60L 53/22* | (2019.01) | |
| *B60L 15/00* | (2006.01) | |
| *B60L 50/51* | (2019.01) | |
| *B60L 53/14* | (2019.01) | |
| *B60L 3/00* | (2019.01) | |

(52) U.S. Cl.
CPC ............ *B60L 53/22* (2019.02); *B60L 15/007* (2013.01); *B60L 50/51* (2019.02); *B60L 53/14* (2019.02); *B60L 3/003* (2013.01); *B60L 2210/30* (2013.01); *B60L 2210/42* (2013.01); *B60L 2210/46* (2013.01); *B60L 2220/58* (2013.01); *B60L 2240/427* (2013.01); *B60L 2240/429* (2013.01)

(58) Field of Classification Search
CPC .................................................... B60L 11/1812
USPC ..................................................... 318/139, 34
See application file for complete search history.

(56) References Cited

U.S. PATENT DOCUMENTS

| | | | | |
|---|---|---|---|---|
| 6,236,583 | B1 * | 5/2001 | Kikuchi ................. | H02P 27/06 318/801 |
| 6,373,211 | B1 * | 4/2002 | Henry .................... | B62D 5/046 318/432 |
| 9,231,464 | B2 | 1/2016 | Oswald et al. | |
| 9,379,597 | B2 * | 6/2016 | Shinohara ............... | H02P 25/22 |

* cited by examiner

Primary Examiner — David Luo
(74) Attorney, Agent, or Firm — David Kelley; Brooks Kushman P.C.

(57) ABSTRACT

An electric drive system for a vehicle includes an electric machine having first conductors arranged in slots of a stator to form phase windings and a second conductor arranged in the slots to form a secondary winding that produces a voltage indicative of a common mode voltage caused by voltages applied to the phase windings. The voltage can be used to supply power to electronic components and for diagnosis and control of the electric machine and an associated inverter.

17 Claims, 9 Drawing Sheets

US 10,525,843 B1

COMMON MODE CURRENT REDUCTION HYBRID DRIVE SYSTEM

TECHNICAL FIELD

This application is generally related to a common mode current reduction system for a hybrid drive system of an electrified vehicle.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a three-phase motor that may be powered by three sinusoidal signals each driven with 120 degrees phase separation. Modern power inverters output a pulse-width modulated voltage to each of the phases and the traction motor impedance results in generally sinusoidal currents. The pulse width modulated voltage causes a common-mode voltage within the traction motor that results in a common-mode current flowing through parts of the traction motor.

SUMMARY

An electric machine includes a rotor and a stator defining a plurality of teeth separated by slots. The electric machine includes first conductors arranged in the slots to form phase windings for driving the rotor. The electric machine further includes a second conductor arranged in the slots to form a secondary winding configured to produce a voltage indicative of a common mode voltage caused by phase voltages applied to the phase windings.

The second conductor may pass through some of the slots that include the first conductors such that the voltage includes an induced voltage component from each of the phase windings. A cross-sectional area of the second conductor may be less than a cross-sectional area of the first conductors. The second conductor may be arranged in some of the slots that define more than one pole-pair of the electric machine. The second conductor may be configured to have an impedance that is lower than an impedance associated with an impedance path through a bearing of the electric machine.

An electric drive system includes an electric machine including first conductors arranged in slots of a stator to form phase windings and a second conductor arranged in the slots to form a secondary winding that produces a voltage indicative of a common mode voltage caused by phase voltages applied to the phase windings. The electric drive system further includes a circuit configured to receive the voltage and power an electronic device.

The second conductor may pass through some of the slots that include the first conductors such that the voltage includes an induced component from each of the phase windings. The circuit may include a rectifier and a capacitor that are configured to convert the voltage to a generally constant voltage level. The electronic device may include a gate driver of an inverter that is configured to drive switching devices. The electric machine may further include a third conductor arranged in the slots to form a second secondary winding that produces a second voltage indicative of the common mode voltage. The third conductor may be arranged in the slots that the second conductor is arranged in. The electric drive system may further include a second circuit that is configured to receive the second voltage and output a diagnostic signal. The second circuit may include an analog to digital converter configured to convert the diagnostic signal to a digital value.

A vehicle includes an electric machine including first conductors arranged in slots of a stator to form phase windings and a second conductor arranged in the slots to form a secondary winding that produces a voltage indicative of a common mode voltage caused by voltages applied to the phase windings. The vehicle further includes a controller configured to operate an inverter according to the voltage to reduce a common mode current in the electric machine.

The second conductor may pass through some of the slots that include the first conductors such that the voltage includes an induced component from each of the phase windings. The controller may be configured to control a switching frequency of switching devices based on the voltage. The electric machine may further include a third conductor arranged in the slots to form a second secondary winding that produces a second voltage indicative of the common mode voltage. The circuit may be configured to receive the second voltage and power an electronic device. The circuit may include a rectifier and a capacitor that are configured to convert the second voltage to a generally constant voltage level. The second conductor may be configured to have an impedance that is lower than an impedance associated with an impedance path through a bearing of the electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
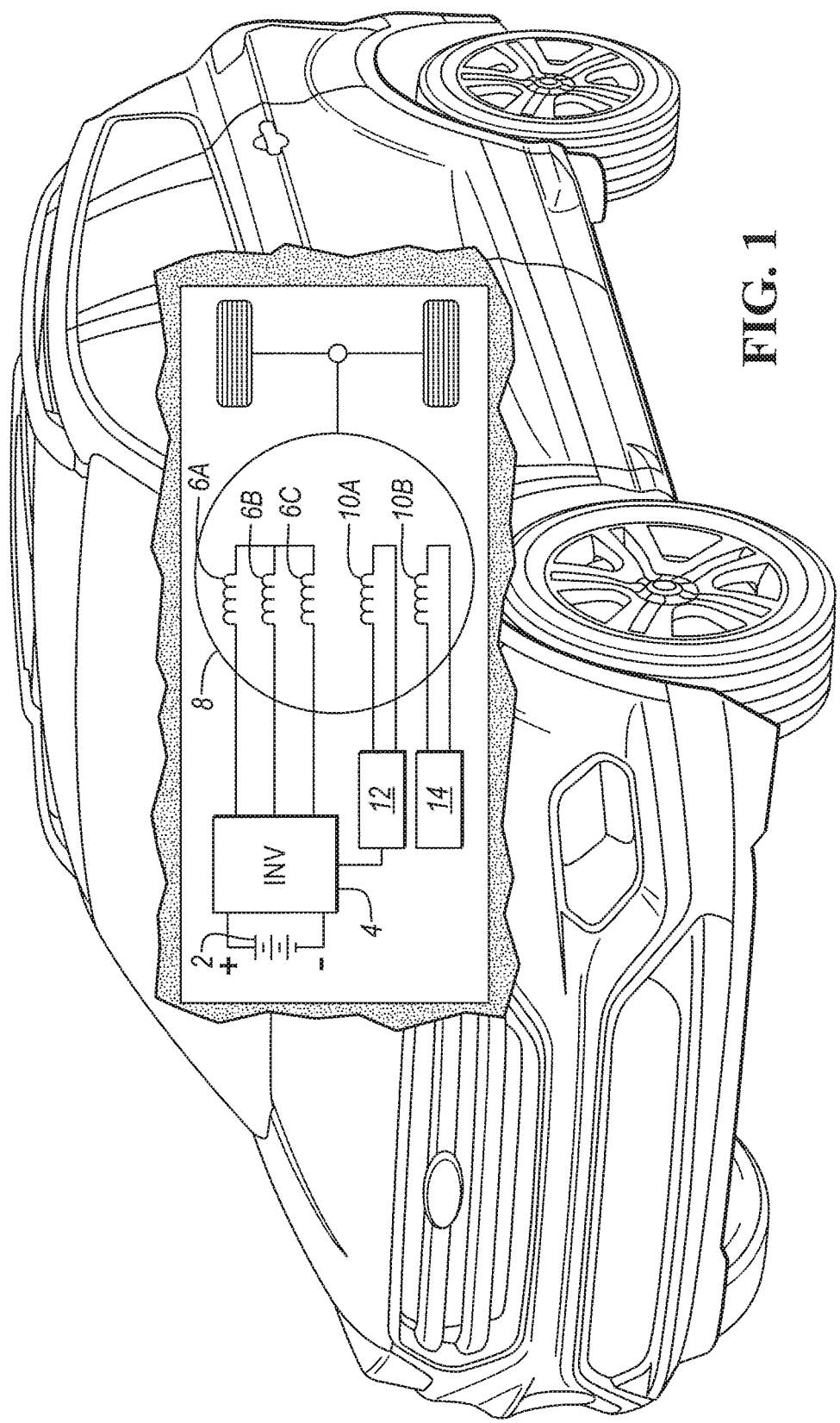
FIG. 1 is a diagram of an electrified vehicle including an electric machine with secondary windings.

FIG. 1 depicts a hybrid electric vehicle illustrating internal electric powertrain components configured to implement secondary windings in an electric machine to form a common-mode voltage (CMV) transformer. A battery 2 may be coupled to an inverter 4. The inverter 4 may be configured with outputs to drive phase windings 6A, 6B, 6C of an electric machine 8. The electric machine 8 further includes a first secondary winding 10A and a second secondary winding 10B. The first secondary winding 10A may be electrically coupled to a rectifier circuit 12. The second secondary winding 10B may be coupled to a diagnostic circuit 14.

Figure 2:
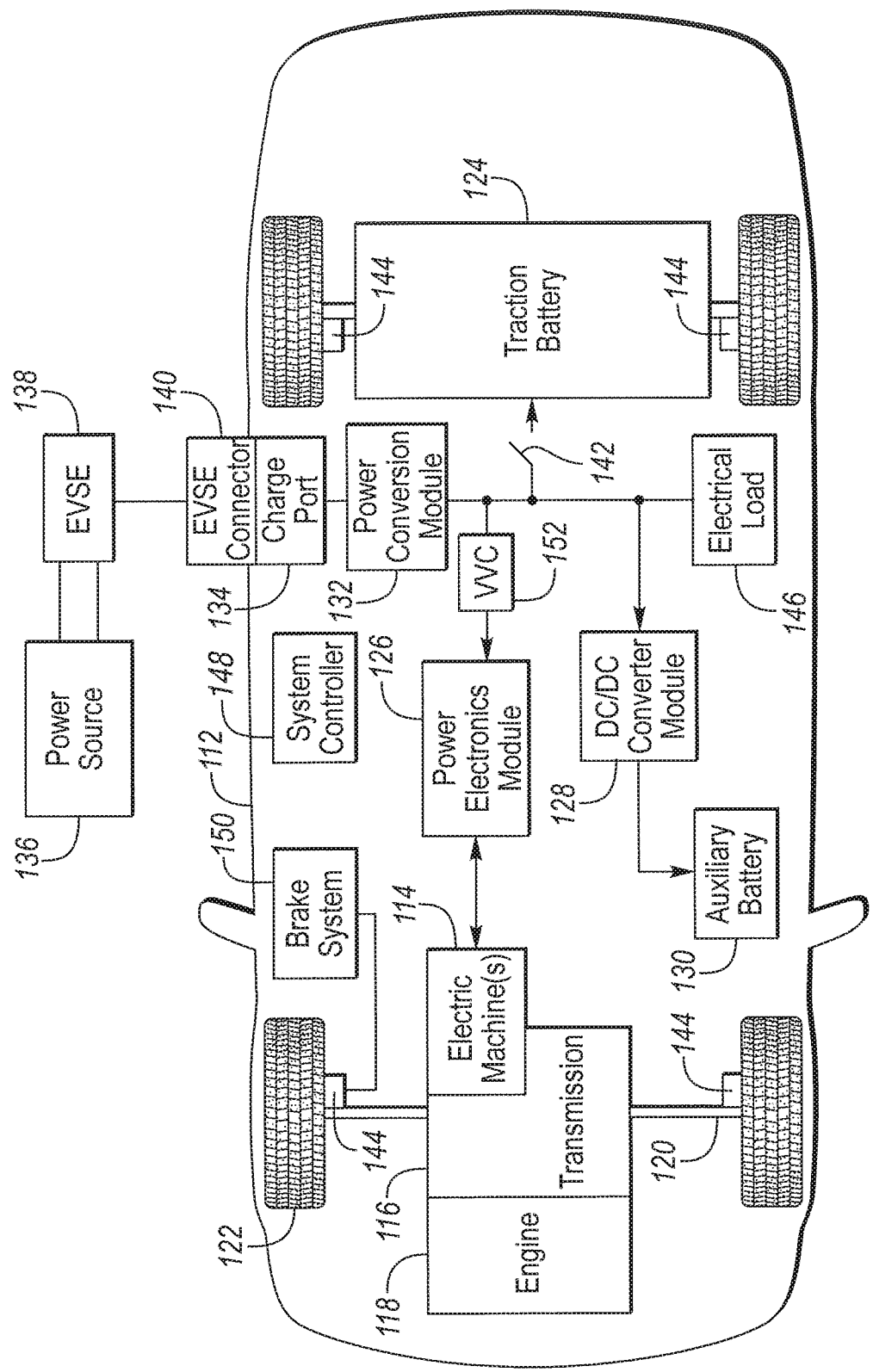
FIG. 2 is a diagram of an electrified vehicle illustrating typical electric drivetrain and energy storage components including an inverter.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied.

The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but it may be implied that the vehicle network may connect to any electronic module that is present in the vehicle 112. A vehicle system controller (VSC) 148 may be present to coordinate the operation of the various components.

Figure 3:
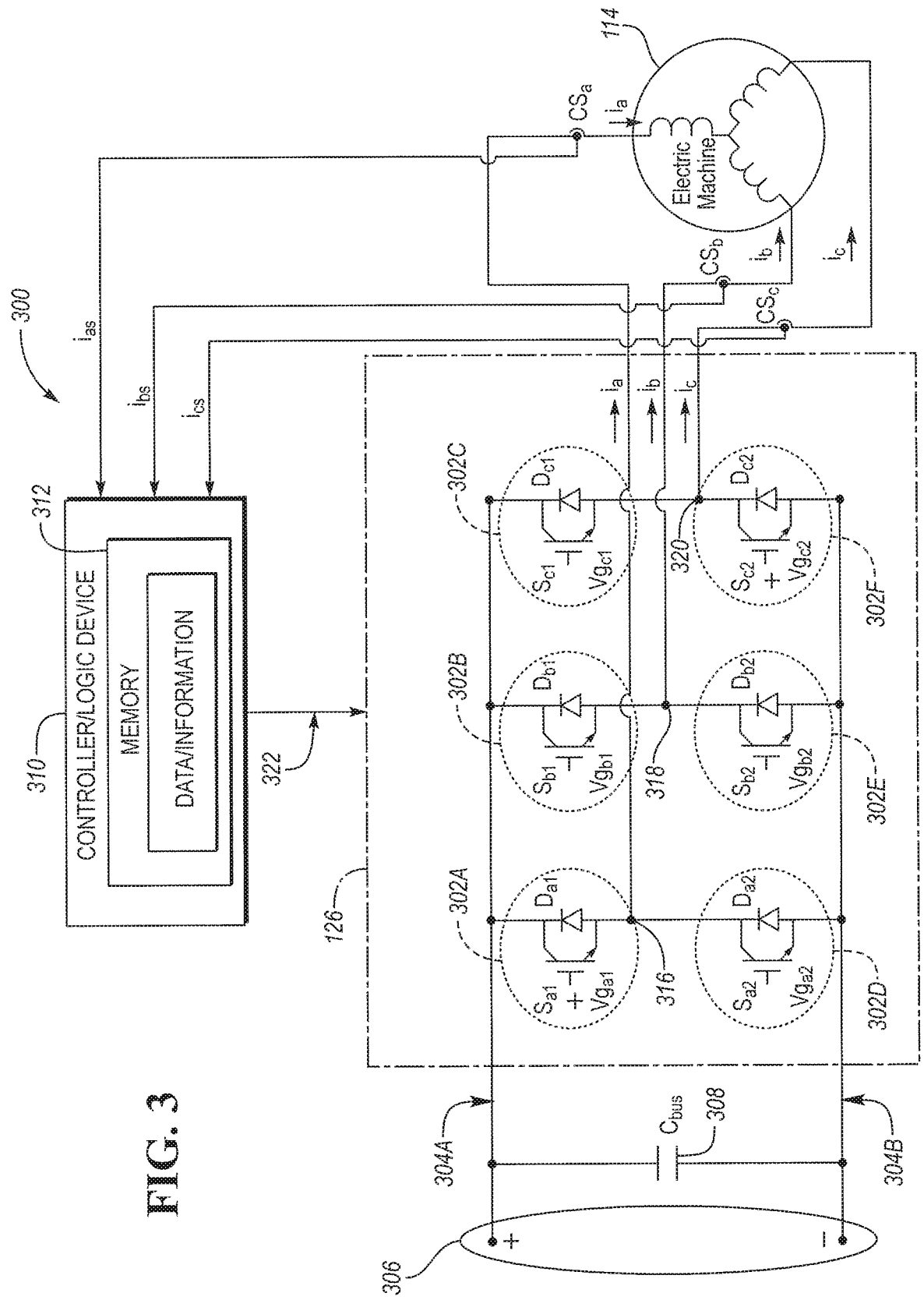
FIG. 3 is a schematic diagram of a power electronics module coupled to an electric machine.

With reference to FIG. 3, a system 300 is provided for controlling a power electronics module (PEM) 126. The PEM 126 of FIG. 3 is shown to include a plurality of switches 302 configured to collectively operate as an inverter with first, second, and third phase legs 316, 318, 320. While the inverter is shown as a three-phase power converter, the inverter may include additional phase legs. For example, the inverter may be a four-phase power converter, a five-phase power converter, a six-phase power converter, etc. In addition, the PEM 126 may include multiple converters with each inverter in the PEM 126 including three or more phase legs. For example, the system 300 may include two or more inverters in the PEM 126. The PEM 126 may further include a DC-DC converter having high-power switches (e.g., IGBTs) to convert a power electronics module input voltage to a power electronics module output voltage via boost, buck or a combination thereof.

The switches 302 may be solid state devices (SSD) such as Insulated Gate Bipolar Junction Transistors (IGBTs), Metal Oxide Semiconductor Field Effect Transistors (MOSFETs), or Bipolar Junction Transistors (BJTs). Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

As shown in FIG. 3, the inverter may be a DC-AC converter. In operation, the DC-AC converter receives DC power from a DC power link 306 through a DC bus 304 and converts the DC power to AC power. The DC power bus may include a positive bus conductor 304A and a return bus conductor 304B. The AC power may be transmitted via the phase currents ia, ib, and ic to drive an AC machine also referred to as the electric machine 114, such as a three-phase permanent-magnet synchronous motor (PMSM) as depicted in FIG. 3. In such an example, the DC power link 306 may be electrically coupled to a DC storage battery (e.g., traction battery 124) to provide DC power to the DC bus 304. In another example, the inverter may operate as an AC-DC converter that converts AC power from the electric machine 114 (e.g., operating as a generator) to DC power that the DC bus 304 can transfer to the DC power link 306. Furthermore, the system 300 may control the PEM 126 in other power electronic topologies.

With continuing reference to FIG. 3, each of the phase leg outputs 316, 318, 320 in the inverter 126 are coupled to associated power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase inverter 126, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter 126 may include any number of the power switches 302 or circuit elements depending on the particular configuration of the inverter 126. The diodes ($D_{xx}$) are connected in parallel with the IGBTs ($S_{xx}$). However, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ may be provided to sense current flow in the respective phase legs 316, 318, 320. FIG. 3 depicts the current sensors $CS_a$, $CS_b$, and $CS_c$ as being separate from the PEM 126. However, the current sensors $CS_a$, $CS_b$, and $CS_c$ may be integrated as part of the PEM 126 depending on the configuration. Current sensors $CS_a$, $CS_b$, and $CS_c$ of FIG. 3 may be installed in series with each of phase legs A, B and C (i.e., phase legs 316, 318, 320 in FIG. 3) and provide respective feedback signals for the phase currents $i_{as}$, $i_{bs}$, and $i_{cs}$ (also illustrated in FIG. 3) of the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, ib, and $i_c$ such that the phase currents $i_a$, ib, and $i_c$ flow through the phase legs 316, 318, 320 and into the respective phase windings of the electric machine 114 according to various current or voltage patterns. For example, current patterns can include patterns of phase currents $i_a$, ib, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. The memory 312 may include both persistent and non-persistent memory devices. For example, persistent memory may include read-only memory (ROM), FLASH memory, and magnetic storage. Non-persistent memory may include random access memory (RAM). The memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 may transmit at least one control signal 322 to the power converter system 126. The power converter system 126 may receive the control signal 322 and control the switching configuration of the inverter 126 to control the current flow through the respective phase legs 316, 318, and 320. The switching configuration may be a set of switching states of the power switches 302 in the inverter 126. In general, the switching configuration of the inverter 126 determines how the inverter 126 converts power between the DC power link 306 and the electric machine 114.

To control the switching configuration of the inverter 126, the inverter 126 changes the switching state of each power switch 302 in the inverter 126 to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter 126 is shown as a voltage-driven device in FIG. 3, the inverter 126 may be a current-driven device or controlled by other strategies that switch the power switches 302 between ON and OFF states. The controller 310 may change the gate drive for each of the power switches 302 based on the rotational speed of the electric machine 114, the mirror current, or a temperature of the power switch. The change in gate drive may be selected from a plurality of gate drive currents in which the change gate drive current is proportional to a change in switching speed of the power switches.

As also shown in FIG. 3, each phase leg 316, 318, and 320 includes two switches 302. In general, each phase leg includes a switch coupled between the positive bus conductor 304A and the associated phase leg output (upper switch) and a switch coupled between the return bus conductor 304B and the associated phase leg output (lower switch). However, only one switch in each of the legs 316, 318, 320 may be in the ON state without shorting the DC power link 306. Thus, in each phase leg, the switching state of the lower switch is typically opposite the switching state of the corresponding upper switch. The upper switches may be referred to as high-side switches (i.e., 302A, 302B, 302C) and the lower switches may be referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 3: (1) two of the phase legs may be in the HIGH state while the third phase leg is in the LOW state, or (2) one phase leg may be in the HIGH state while the other two of the phase legs are in the LOW state. Thus, one phase leg in the three-phase converter, which may be defined as the "reference" phase for a specific active state of the inverter, is in a state opposite to the other two of the phase legs, or "non-reference" phases, that have the same state. Consequently, the non-reference phases are either both in the HIGH state or both in the LOW state during an active state of the inverter.

The power switches 302 may be controlled with a Pulse-Width Modulated (PWM) gate control signal. The gate control signal may be further characterized with a switching frequency. The switching frequency may define a fastest rate at which a duty cycle of the PWM gate signal may be changed. By controlling the duty cycle of the gate control signals, a sinusoidal current output for each phase leg may be achieved. The voltage at the phase leg output may achieve two levels depending upon the switching state. The two levels are the positive bus voltage and the return bus voltage. The LD 310 may be programmed to vary the duty cycle of the gate control signals to achieve a sinusoidal current through the phase windings. However, because the voltages are not sinusoidal waveforms, a common mode voltage exists. Note that in a balanced three-phase system, the voltages would sum to zero. In a PWM system, the voltages cannot sum to zero. This results in the presence of a common mode voltage (CMV). The CMV may have a value that is the average voltage of the phase legs. In a three-phase example, the CMV may be (Va+Vb+Vc)/3, where Vx are the phase voltages of each phase winding.

The CMV is a by-product of the PWM mode of operation and may have negative effects on the system. The CMV may cause current in the stator of the electric machine causing additional heating. The CMV may cause current flow through bearings which can lead to degradation of the bearings. As such, reducing the CMV can have beneficial effects for the electric machine.

Figure 4:
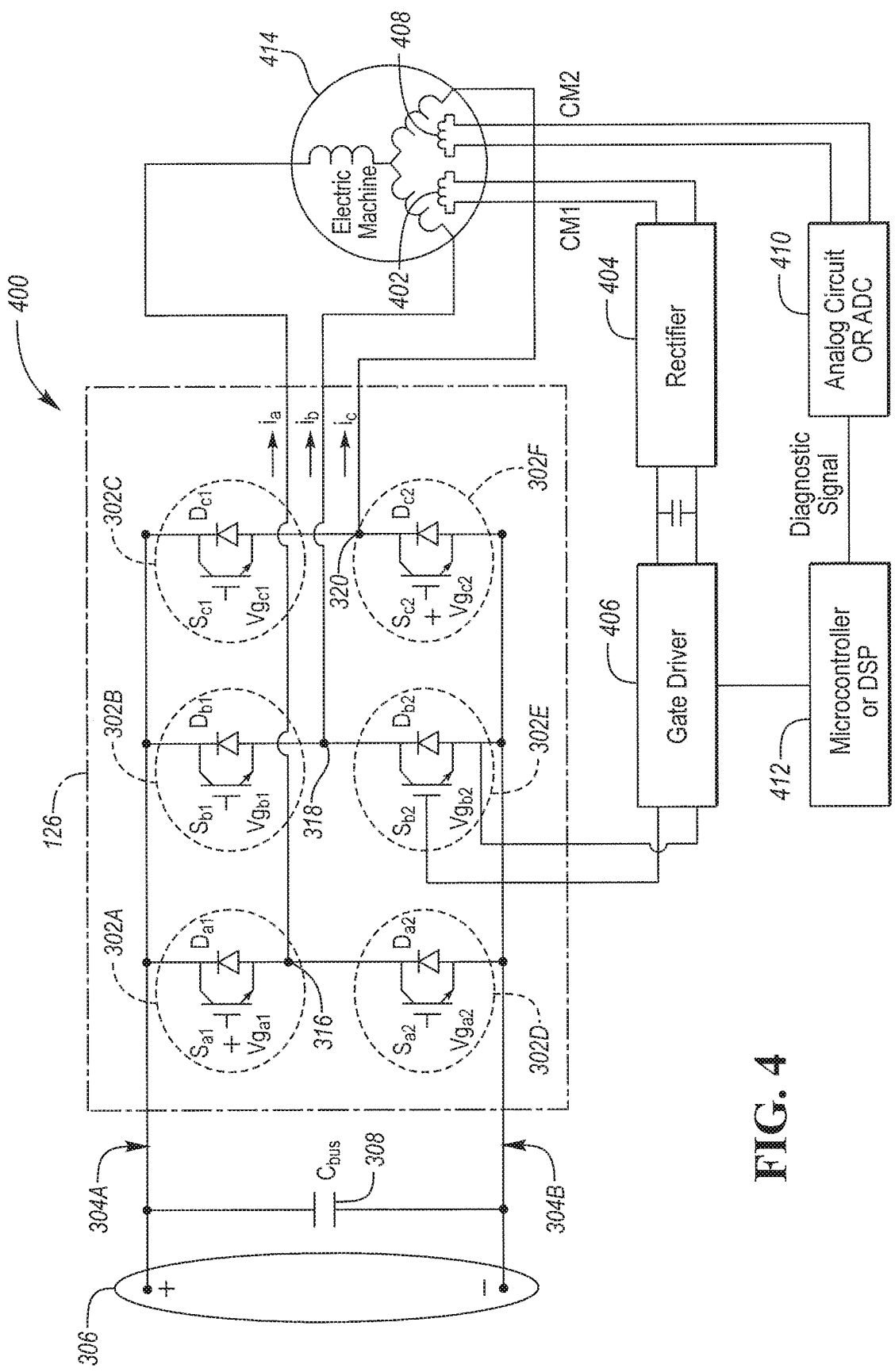
FIG. 4 is a schematic diagram of a power inverter and electric machine with a common mode current reduction circuit.

FIG. 4 depicts an electric drive system 400 having an electric machine that includes one or more secondary windings. The electric drive system 400 may include an electric machine 414 that includes three phase windings that are configured to rotate a shaft and rotor when driven by current. In addition, the electric machine 414 may include a first secondary winding 402 and the second secondary winding 408. The first secondary winding 402 and the second secondary winding 408 may be configured to operate as a CMV transformer. For example, the first secondary winding 402 may be configured to harvest power of the CMV that would cause current to flow through the structure of the electric machine 414. The first secondary winding 402 may provide a low-impedance path for the common-mode current. This may reduce undesired common-mode current flowing through the electric machine 414, particularly the bearings. The second secondary winding 408 may be similarly configured.

The first secondary winding 402 may be electrically coupled to a rectifier circuit 404. The rectifier circuit 404 may be configured to process an AC voltage from the first secondary winding 402 so that current only flows in one direction. The rectifier circuit 404 may include an arrangement of passive circuit elements such as diodes. The rectifier circuit 404 may include a capacitor to smooth the resulting voltage. The rectifier circuit 404 may be configured to provide a generally constant DC voltage level at the output.

The output of the rectifier circuit 404 may be electrically coupled to a gate driver circuit 406. The gate driver circuit 406 may be configured to drive gate inputs of the power switches 302. The gate driver circuit 406 may be powered by the output of the rectifier circuit 404. The gate driver circuit 406 may be alternatively powered by the low-voltage bus when no power is being received from the rectifier circuit 404. For example, under conditions in which the electric machine phase windings are not driven, there may be no CMV-induced currents flowing.

The gate driver circuit 406 may also be controlled by control signals from a controller 412. For example, the controller 412 may provide the gate drive signals as a PWM signal. The gate driver circuit 406 may filter and process the gate drive signals to provide a physical gate drive voltage with the appropriate characteristics to drive the power switches 302 in the desired state.

The second secondary winding 408 may be electrically coupled to diagnostic circuit 410 that is configured to output a diagnostic signal. The diagnostic signal may be input to a controller 412. The diagnostic circuit 410 may be an analog circuit and may include an analog-to-digital converter. The analog circuit may include elements for filtering the voltage received from the second secondary winding 408. The controller 412 may be programmed to monitor the diagnostic signal to determine if the electric machine 414 and/or the power electronics module 126 is operating properly. In some configurations, the controller 412 may utilize the diagnostic signal to control operation of the power switches 302. For example, the controller 412 may operate the power switches 302 to reduce the CMV below a predetermined level.

Figure 5:
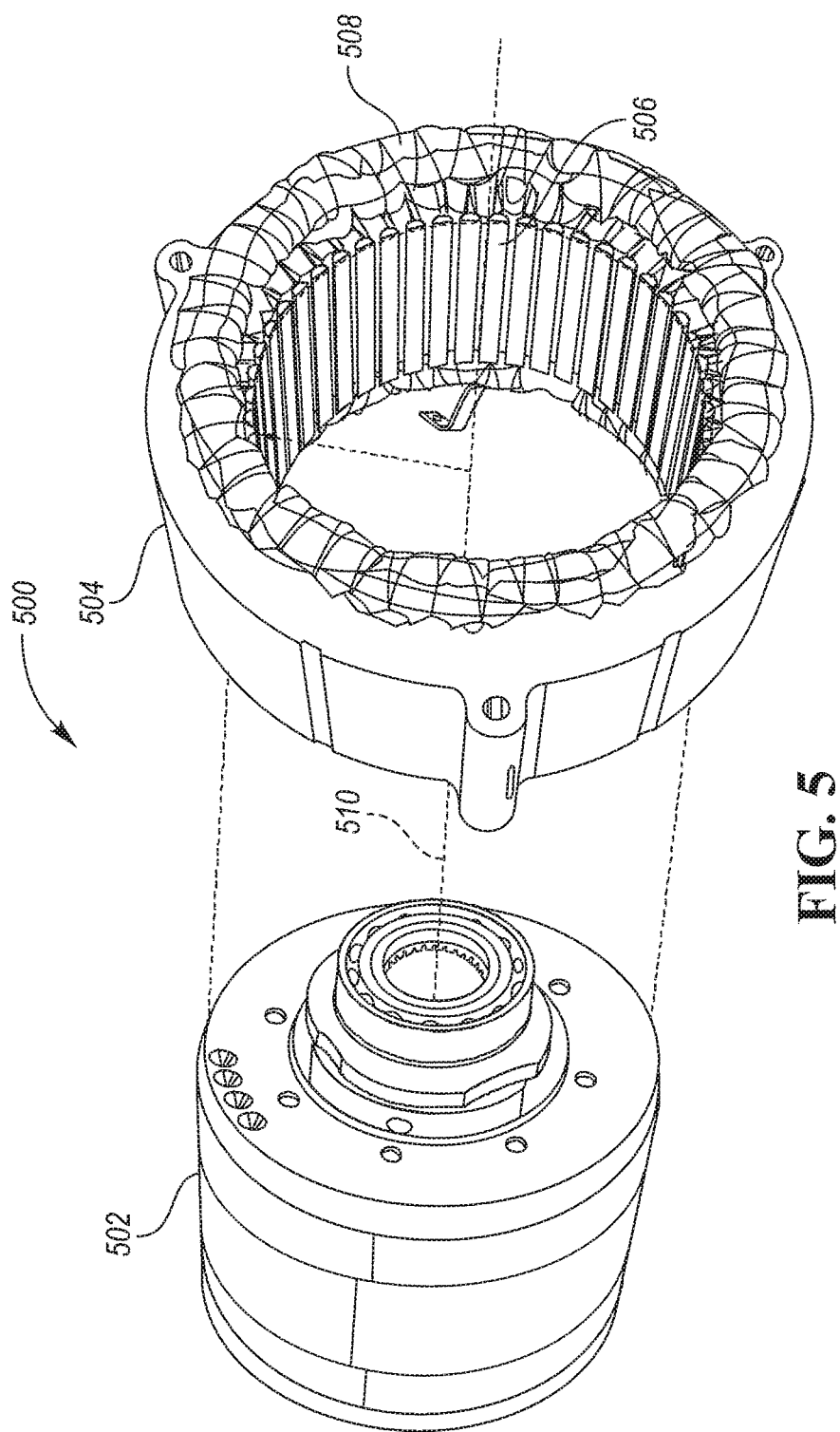
FIG. 5 is an exploded view of an electric machine illustrating stator teeth and a rotor.

The electric machine may include a rotor and a stator defining a plurality of teeth separated by slots. The electric machine may further include a first set of conductors arranged in the slots to form phase windings for driving the rotor. FIG. 5 is an exploded perspective view of an electric machine 500 having a stator 504 that defines a plurality of stator teeth 506 along an inner diameter that defines a cavity configured to permit a rotor 502 to spin freely about a rotational axis 510. Each of stator teeth 506 has a winding around it to induce a field channeled by the tooth upon which the winding is wound. In this example, the stator has 48 stator teeth. Also, the stator 504 includes end windings 508 that carry a current in windings that travel in the slots in between the stator teeth 506 to induce a field in the stator teeth 506. In this application a current flowing in the end windings 508 between a connection point and a slot is assumed to be insufficient to induce a field in a stator tooth, while the current when flowing in a winding located in a slot is sufficient to induce a field in a stator tooth.

Figure 6:
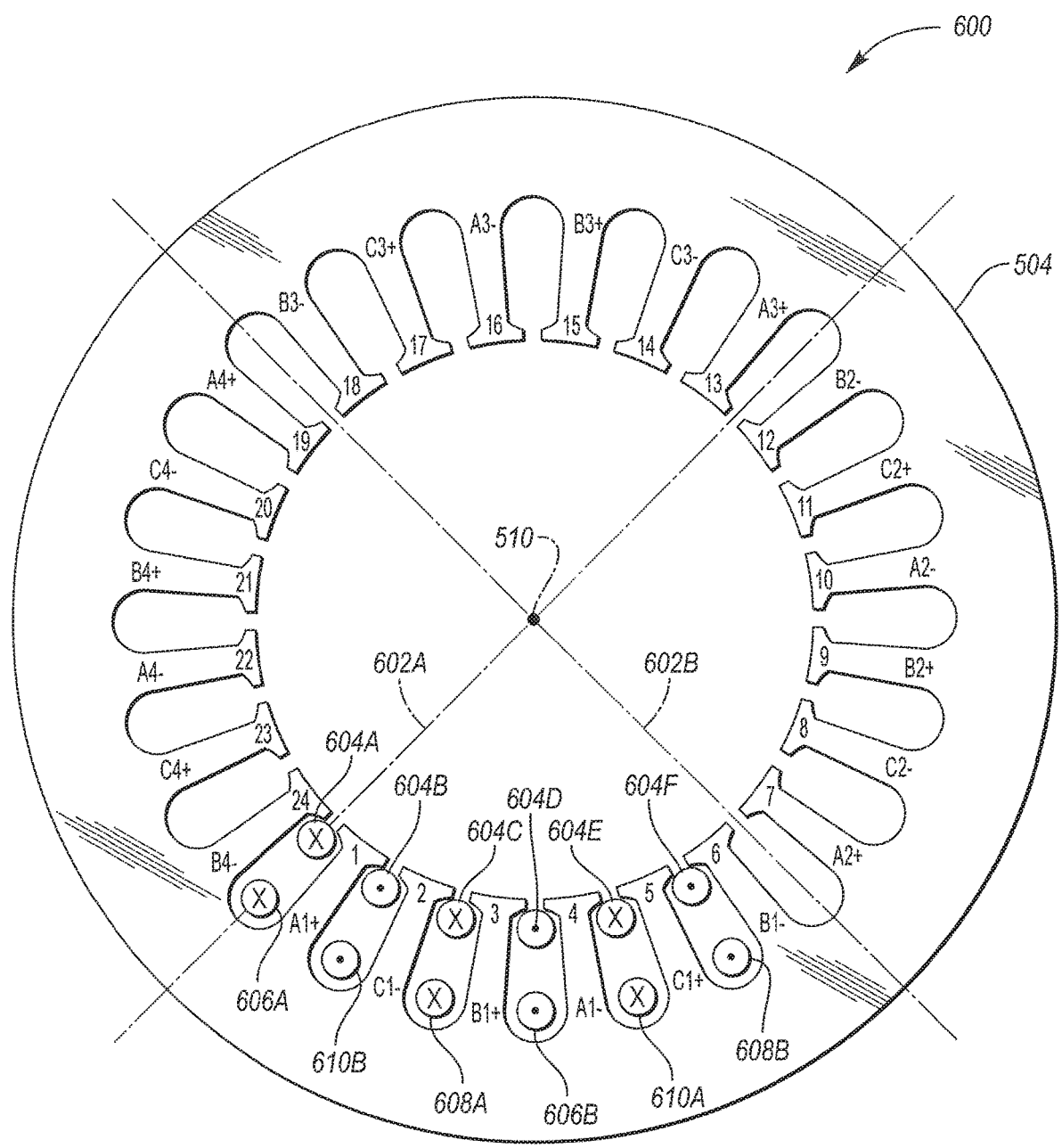
FIG. 6 is a cross sectional view of a stator core for an electric machine illustrating power windings and common mode voltage windings to form a common mode transformer.

FIG. 6 is a cross sectional view of a stator core 600 for an electric machine. Here, a 24-tooth stator is shown. The stator 504 may be symmetrical around the rotational axis 510 about which the rotor may be configured to spin. The stator 504 may be divided into sections by a first plane 602A and a second plane 602B that intersect along the rotational axis 510. In this example configuration, the phase windings may be defined by windings associated with the teeth. For example, teeth associated with the first phase winding may be labeled as Ax+ and Ax−. Teeth associated with the second phase winding may be labeled as Bx+ an Bx−. Teeth associated with the third phase winding may be labeled as Cx+ and Cx−.

The teeth may define slots into which wiring may be inserted to form the phase windings. Each winding may enter the slot clockwise to the positive label and exit in the slot clockwise to the negative label thus inducing a field in three stator teeth therebetween. For example, the first phase winding may be formed by a conductor segment 606A that is routed in the slot clockwise from A1+ and returns via a conductor segment 606B that is routed in the slot clockwise from A1−. The first phase winding consisting of A1+ and A1− may induce a field in the teeth numbered 1, 2, and 3. The second phase winding may be formed by a conductor segment 608A that is routed in the slot clockwise from B1+ and returns via a conductor segment 608B that is routed in the slot clockwise from B1−. The third phase winding may be formed by a conductor segment 610A that is routed in the slot clockwise from C1+ and returns via a conductor segment 610B that is routed in the slot clockwise from C1−. The second phase winding consisting of B1+ and B1− may induce a field in the teeth numbered 3, 4, and 5, and the third phase winding consisting of C1+ and C1− may induce a field in the teeth numbered 2, 3, and 4. Further, each lead may occupy any number of slots thus, each winding can occupy 2, 4, 6, 8, etc. slots.

The phase windings may include a plurality of wiring segments. The pattern depicted may be repeated a number of times such that each of the phase windings may be comprised of a number of wiring loops arranged about the teeth in the pattern shown. Note that other wiring patterns are possible and the secondary windings described herein may be applied to these other wiring patterns.

Figure 7:
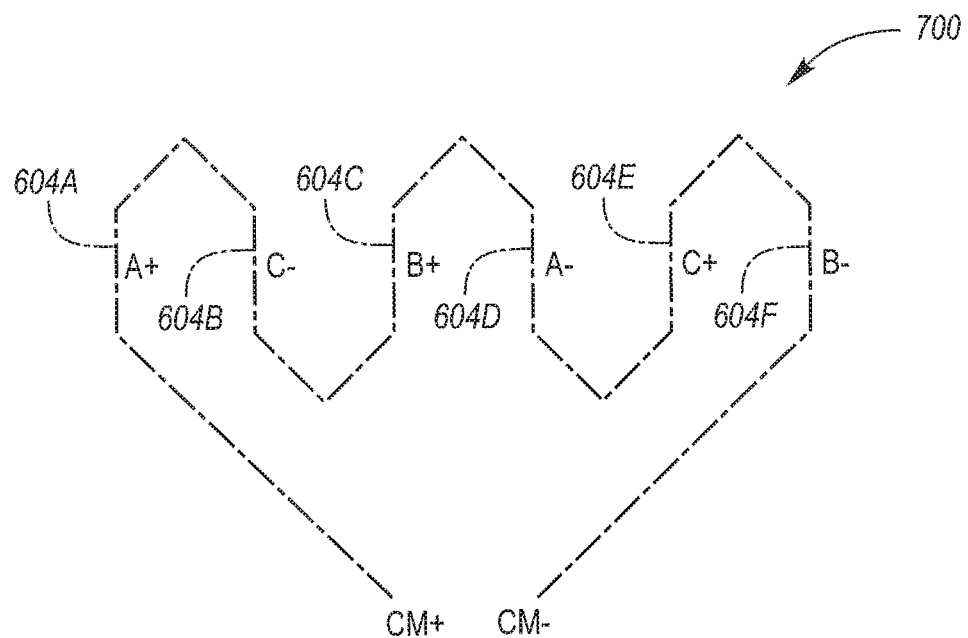
FIG. 7 is a wiring diagram of a common mode voltage winding for a stator core.

The above describes how the phase windings for driving the electric machine may be configured. Also, depicted is the secondary winding configuration. The electric machine may include a conductive element arranged in the slots to form one or more secondary windings configured to produce a voltage indicative of a common mode voltage caused by phase voltages applied to the phase windings. The secondary winding may include conductor segments 604A-F that may be arranged in the slots as shown in FIG. 7. FIG. 6 depicts the secondary winding as being inserted closest to the rotational axis 510. However, in some configurations, the relative position of the secondary windings (defined by 604A-F) and the power windings (defined by 606, 608, and 610) may be swapped. Further, some configurations may include a second secondary winding similar that defined by 604A-F. In such configurations, the power windings may be wrapped between the secondary windings. The placement of the windings within the slots may be chosen to optimize the CMV properties.

FIG. 7 depicts a possible winding diagram for the secondary windings. The secondary windings may be configured to pass through all of the machine phases to cover the CMV path. The secondary windings may be configured such that a voltage is induced by each of the power phase windings. By forming a loop that includes all of the phase voltages, the CMV may induce a current in the secondary windings. As an example, a first segment 604A represents that portion of the secondary winding that is routed next to the A+ tooth. The conductor may then be routed next to the C− tooth as represented by a second segment 604B. The conductor may then be routed next to the B+ tooth as represented by a third segment 604C. The conductor may then be routed next to the A-tooth as represented by a fourth segment 604D. The conductor may then be routed next to the C+ tooth as represented by a fifth segment 604E. The conductor may then be routed next to the B− tooth a represented by a sixth segment 604F. The pattern may be reproduced to achieve a predetermined number of turns or iterations for the secondary winding 604. The terminals of the secondary winding may be the connections to the first segment 604A and the sixth segment 604F.

The example depicted shows the secondary winding formed in one of the pole-pairs of the electric machine. The secondary winding may cover multiple pole-pairs or all pole pairs of the electric machine. Further, the secondary winding may extend to other sections of the stator 504. As an example, the B1− slot may be coupled to the A2+ slot. The conductor may be routed with the same pattern.

The conductive element may pass through slots that include conductors from the conductors that make up the phase windings such that the voltage includes an induced voltage component from each of the phase windings. The cross-sectional area of the conductive element making up the secondary windings may be less than a cross-sectional area of conductors forming the phase windings. The conductive element for the secondary windings may be arranged in slots that define more than one pole-pair of the electric machine. The conductive element for the secondary windings may be configured to have an impedance that is lower than an impedance associated with an impedance path through a bearing of the electric machine.

Referring again to FIG. 4, the controller 412 may be configured to receive the signal indicative of the common mode voltage. The controller 412 may be configured to adjust the operation of the switches 302 based on the voltage. For example, the controller 412 may be configured to adjust the switching frequency to reduce the common mode voltage to a desired level. For example, reducing the switching frequency may reduce the common mode voltage. In some configuration, the controller 412 may change the common mode voltage by altering the switching pattern of the power switches 302.

Figure 8:
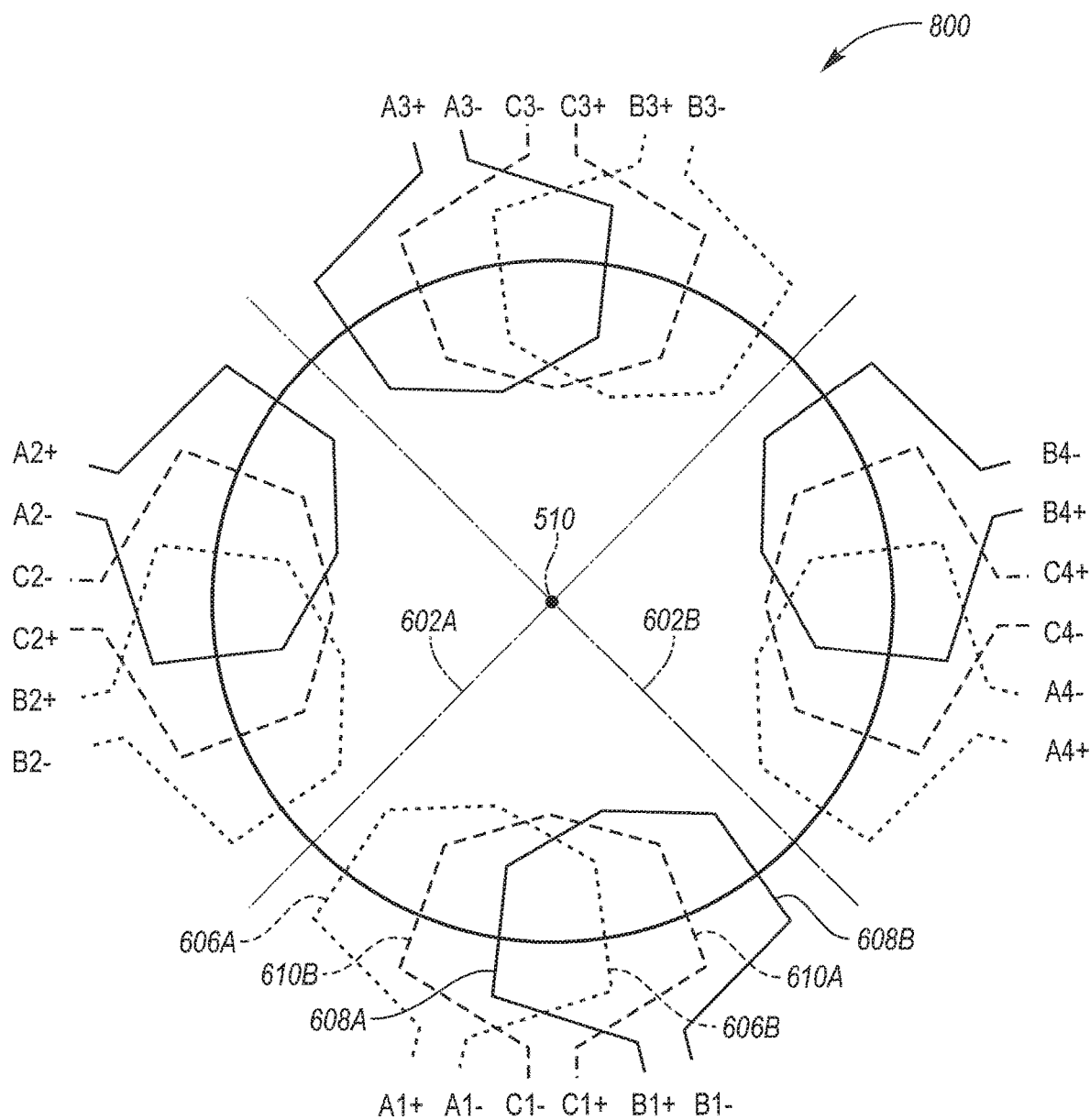
FIG. 8 is a cross sectional diagram of a configuration of stator windings.

FIG. 8 is a cross sectional schematic diagram of power winding connections 800 for a stator of an electric machine. Here, twelve windings are shown associated with a 24-tooth stator. In each section of the stator are the 3-phase leads A 606, B 608, and C 610. In one embodiment, each lead in this diagram may be associated with one stator tooth when the stator has 24 teeth, however if this was a 48-tooth stator, each lead may be associated with two stator teeth. However, in other configurations, each lead in this diagram may be associated with more than one stator tooth, such as 3 stator teeth or 6 stator teeth. Also, each winding shown here with two leads (e.g., A1+ and A1−) may occupy any number of slots. So, each winding can occupy 2, 4, 6, 8, etc. slots. A slot is the open area between two stator teeth wherein copper windings may be placed inside the slots. The number of slots is equal to the number of teeth. Further, the stator may be divided in half along a first plane 602A (e.g., a reference plane) that intersects with a rotational axis 510 of the electric machine. The stator may be further divided into quarters by a second plane 602B that also intersects with the rotational axis 510.

In a single-inverter configuration, the associated phase windings may be coupled in series such that three-phase leads are defined. In this example, the connection labeled A1− may be electrically connected to A2+. A2− may be electrically coupled to A3+. A3− may be electrically coupled to A4+. A4− may be electrically coupled to a neutral conductor. The connection labeled A1+ may be electrically coupled to the first phase leg output 316. Similarly, the second phase winding may be defined by electrically coupling B1− to B2+, B2− to B3+, B3− to B4+, and B4− to the neutral conductor. The connection labeled B1+ may be electrically coupled to the second phase leg output 318. Similarly, the third phase winding may be defined by electrically coupling C1− to C2+, C2− to C3+, C3− to C4+, and C4− to the neutral conductor. The connection labeled C1+ may be electrically coupled to the third phase leg output 320. The phase windings may be continuous wires that are routed through the slots as described above. The electrical connections between the slots may form end windings of the stator.

Figure 9:
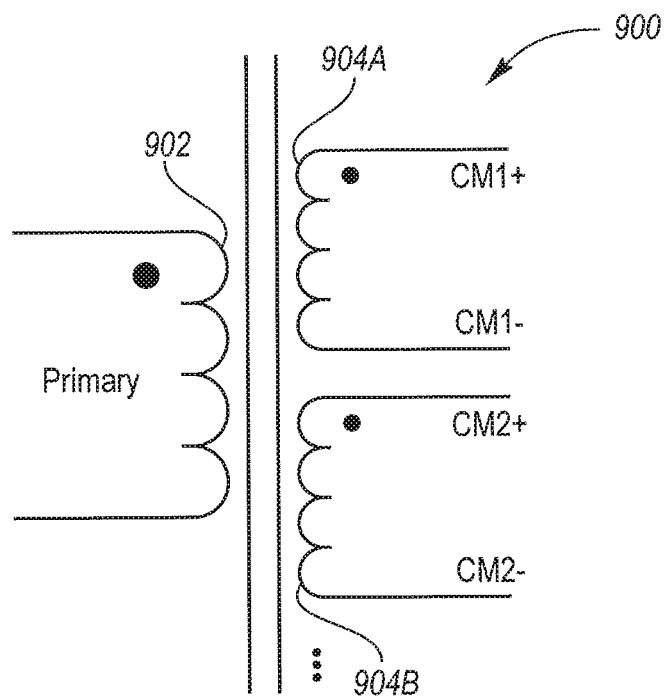
FIG. 9 is a schematic diagram of a common mode voltage transformer.

FIG. 9 depicts an electrical schematic 900 of the resulting CMV transformer that may be formed by including two secondary windings within the stator slots. The CMV transformer may be modeled as a primary winding 902 that is magnetically coupled to a first secondary winding 904A and a second secondary winding 904B. The first secondary winding 904A and the second secondary winding 904B may be electrically isolated from one another and share a common magnetic core formed by the stator metal structure and a common primary winding 902. During operation of the power windings using PWM signals, a CMV is created at the primary winding 902. The CMV is induced in the first secondary winding 904A and the second secondary winding 904B.

Figure 10:
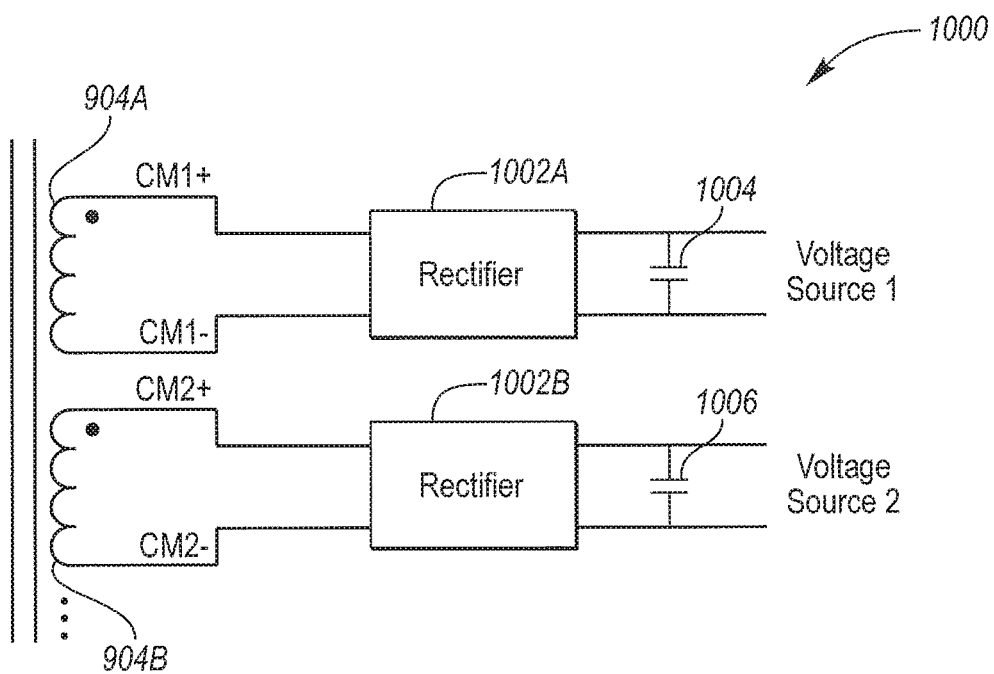
FIG. 10 is a schematic diagram of a common mode voltage transformer isolation circuit.

The voltage induced in the secondary windings may depend upon the number of turns in the corresponding secondary winding. By using a different number of turns in each secondary winding, different voltage levels may be created. FIG. 10 depicts a first system configuration 1000 in which the secondary windings are configured to be voltage sources. The first secondary winding 904A may be electrically coupled to a first rectifier network 1002A. The first rectifier network 1002A may cause current to flow in one direction at the output of the first rectifier network 1002A. For example, the output of the first rectifier network 1002A may be electrically coupled to a DC bus to function as a voltage source. A first capacitor 1004 may be electrically coupled across output terminals of the first rectifier network 1002A. The first capacitor 1004 may smooth and filter the output of the first rectifier network 1002A resulting in a DC voltage level.

The second secondary winding 904B may be electrically coupled to a second rectifier network 1002B. The second rectifier network 1002B may cause current to flow in one direction from to the output of the second rectifier network 1002B. For example, the output of the second rectifier network 1002B may be electrically coupled to a DC bus to function as a voltage source. A second capacitor 1006 may be electrically coupled across output terminals of the second rectifier network 1002B. The second capacitor 1006 may smooth and filter the output of the second rectifier network 1002B resulting in a DC voltage level.

The frequency of the CMV does not depend on the frequency of the current through the power windings. The frequency of the CMV may be equal to the switching frequency of the inverter which may be in the range of 1-20 KHz. The switching frequency may be that frequency at which the gate drive signals of the power switches are changed. As a result, the capacitance value of the capacitor at the output of the rectifier network may be a value that is sufficient to filter the PWM frequency. The resulting CMV transformer may not pass the DC component of the CMV. The output voltage of each rectifier network 1002 may be adjusted by selecting the number of windings for the associated secondary winding 904. The CMV transformer may be used to supply different voltage levels that are galvanically isolated from one another. If a secondary winding becomes short-circuited, the secondary winding may drop to zero voltage. The magnetic coupling between the secondary windings may cause all voltage sources to drop to zero voltage as well.

The CMV transformer may be used to serve as a power source for the inverter gate drive circuitry. Since one failed voltage source may drive the others to zero, this may cause all gate drivers to shut down. By stopping the gate drive circuitry, the CMV voltage is also stopped and the switching devices are no longer being switched. This may provide an additional mechanism for stopping the gate drive circuit.

Figure 11:
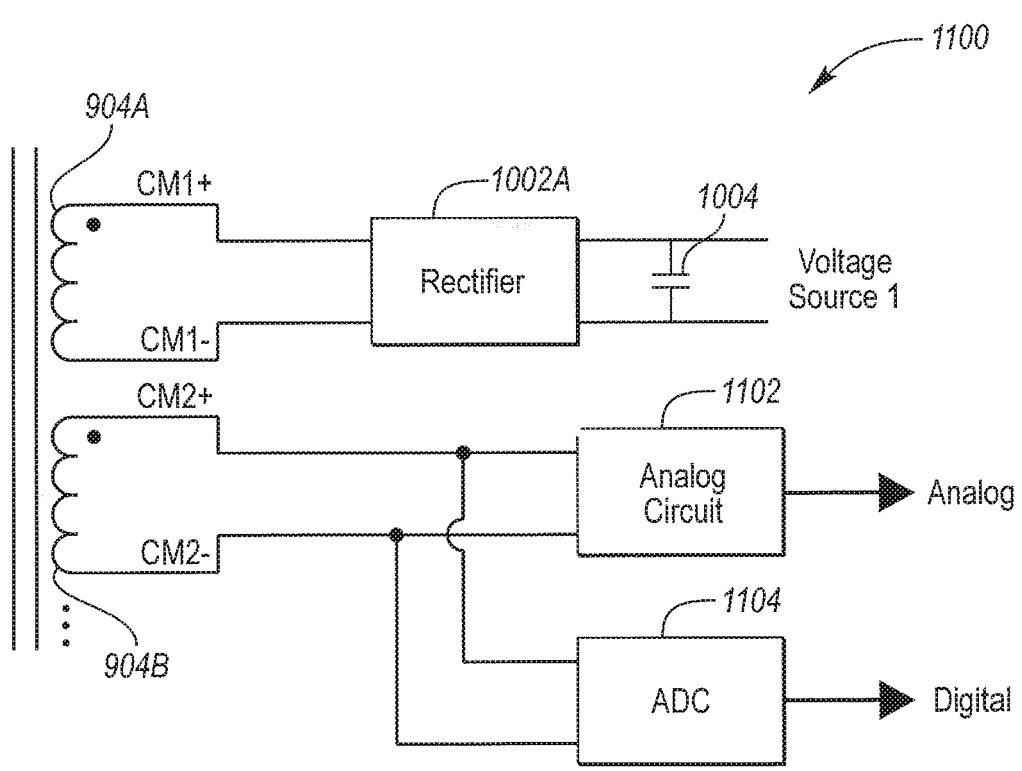
FIG. 11 is a schematic diagram of a common mode voltage transformer isolation circuit configured as a digital and analog diagnostic sensor.

The CMV transformer may also be utilized as a diagnostic sensor. FIG. 11 depicts a second system configuration 1100 that includes a voltage source and a diagnostic circuit. The voltage source may include the first secondary winding 904A coupled to the first rectifier network 1002A and first capacitor 1004 as described previously. The diagnostic circuit may be coupled to the second secondary winding 904B. The diagnostic circuit may include an analog circuit 1102 and an analog-to-digital (A/D) converter 1104. The A/D converter 1104 may be configured to convert the output of the second secondary winding 904B to a digital value for use by the controller (e.g., controller 412 in FIG. 4). The analog circuit 1102 may include components to generate an analog signal indicative of the CMV. For example, the analog circuit 1102 may be configured to output an analog signal indicative of the frequency of the CMV.

The diagnostic sensor may provide information on system operation. The diagnostic sensor may be configured to detect that the electric machine cables are connected properly. For example, if a phase winding is not connected to the associated phase leg of the inverter, a distinct analog signal may be generated. The diagnostic sensor may also be configured to detect if one or more of the switching devices are functioning.

The diagnostic sensor may also be configured to detect the level of CM current that may be flowing through the bearings. The diagnostic sensor may also be configured to detect proper operation of the inverter such as reconstructing the PWM ratios and detecting rising/falling edges of the inverter switches. Proper operation may be determined by monitoring the analog and digital outputs of the diagnostic circuit during normal operating conditions. The analog and digital outputs may also be monitored during abnormal operating conditions. Differences in the signals may be observed between normal and abnormal operating conditions. The controller 412 may be programmed to identify the abnormal operating conditions by monitoring the analog and digital outputs of the diagnostic sensor. The controller 412 may shut down operation of the inverter responsive to detecting an abnormal operation condition.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a rotor;
a stator defining a plurality of teeth separated by slots;
first conductors arranged in the slots to form phase windings for driving the rotor; and
a second conductor arranged in the slots to form a secondary winding configured to produce a voltage indicative of a common mode voltage caused by phase voltages applied to the phase windings, wherein the second conductor passes through some of the slots that include the first conductors such that the voltage includes an induced voltage component from each of the phase windings.

2. The electric machine of claim 1 wherein a cross-sectional area of the second conductor is less than a cross-sectional area of the first conductors.

3. The electric machine of claim 1 wherein the second conductor is arranged in some of the slots that define more than one pole-pair of the electric machine.

4. The electric machine of claim 1 wherein the second conductor is configured to have an impedance that is lower than an impedance associated with an impedance path through a bearing of the electric machine.

5. An electric drive system comprising:
an electric machine including first conductors arranged in slots of a stator to form phase windings and a second conductor arranged in the slots to form a secondary winding that produces a voltage indicative of a common mode voltage caused by phase voltages applied to the phase windings; and
a circuit configured to receive the voltage and power an electronic device, wherein the circuit includes a rectifier and a capacitor that are configured to convert the voltage to a generally constant voltage level.

6. The electric drive system of claim 5 wherein the second conductor passes through some of the slots that include the first conductors such that the voltage includes an induced component from each of the phase windings.

7. The electric drive system of claim 5 wherein the electronic device includes a gate driver of an inverter that is configured to drive switching devices.

8. The electric drive system of claim 5 wherein the electric machine further includes a third conductor arranged in some of the slots to form a second secondary winding that produces a second voltage indicative of the common mode voltage.

9. The electric drive system of claim 8 wherein the third conductor is arranged in the slots that the second conductor is arranged in.

10. The electric drive system of claim 8 further comprising a second circuit that is configured to receive the second voltage and output diagnostic signal.

11. The electric drive system of claim 10 wherein the second circuit includes an analog to digital converter configured to convert the diagnostic signal to a digital value.

12. A vehicle comprising:
an electric machine including first conductors arranged in slots of a stator to form phase windings and a second conductor arranged in the slots to form a secondary winding that produces a voltage indicative of a common mode voltage caused by voltages applied to the phase windings; and
a controller configured to operate an inverter according to the voltage to reduce a common mode current in the electric machine and to control a switching frequency of switching devices based on the voltage.

13. The vehicle of claim 12 wherein the second conductor passes through some of the slots that include the first conductors such that the voltage includes an induced component from each of the phase windings.

14. The vehicle of claim 12 wherein the electric machine further includes a third conductor arranged in the slots to form a second secondary winding that produces a second voltage indicative of the common mode voltage.

15. The vehicle of claim 14 further comprising a circuit configured to receive the second voltage and power an electronic device.

16. The vehicle of claim 15, wherein the circuit includes a rectifier and a capacitor that are configured to convert the second voltage to a generally constant voltage level.

17. The vehicle of claim 12 wherein the second conductor is configured to have an impedance that is lower than an impedance associated with an impedance path through a bearing of the electric machine.

* * * * *